MARIETTE H. McGUIRE.
Flower-Stands.
No. 151,995.  Patented June 16, 1874.
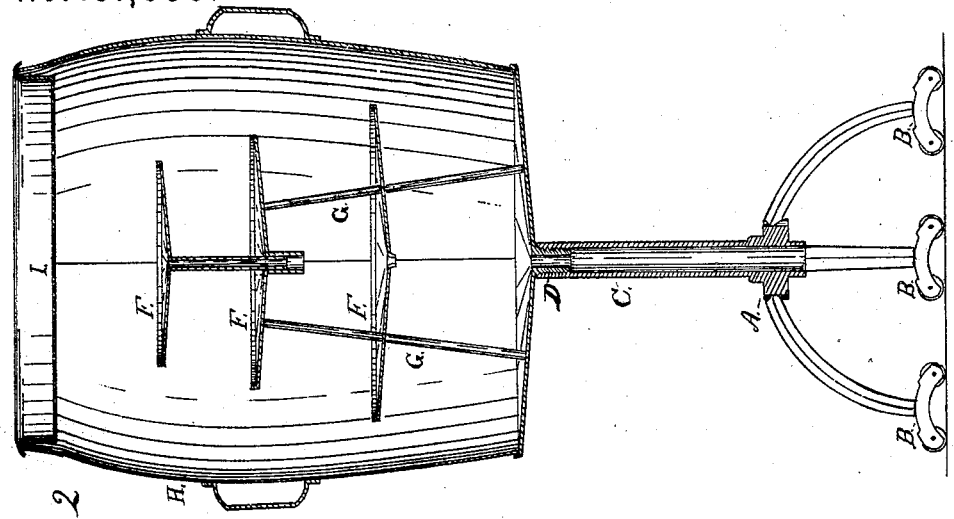
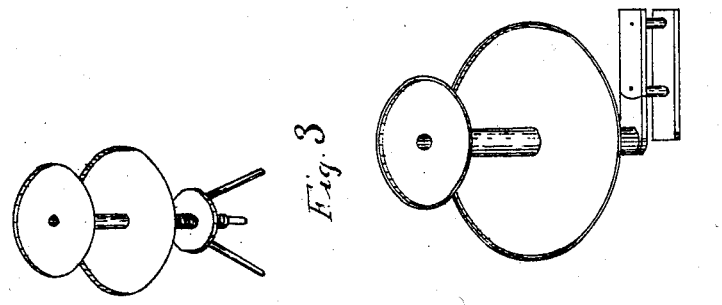
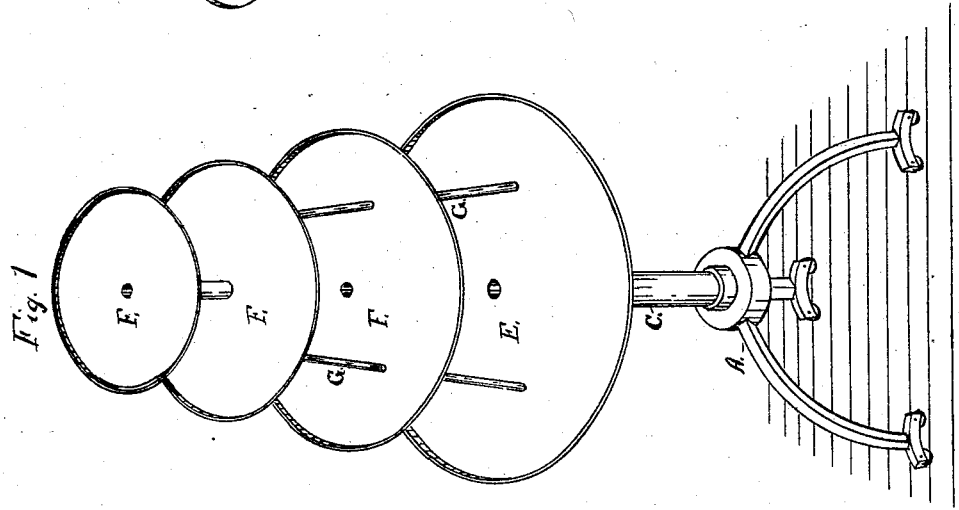
Attest.  Inventor.

United States Patent Office.

MARIETTE H. McGUIRE, OF WASHINGTON, DISTRICT OF COLUMBIA.

IMPROVEMENT IN FLOWER-STANDS.

Specification forming part of Letters Patent No. 151,995, dated June 16, 1874; application filed May 7, 1874.

*To all whom it may concern:*

Be it known that I, MARIETTE HEBER MCGUIRE, of the city of Washington and District of Columbia, have invented certain new and useful Improvements in Flower-Stands; and I do hereby declare the following to be a full, clear, and exact description of the invention, such as will enable others skilled in the art to which it pertains to make and use it, reference being had to the accompanying drawings, which form a part of this specification, and in which—

Figure 1 represents a perspective view of the stand with its removable tables. Fig. 2 is a perpendicular section through the stand, tables, and showering apparatus. Fig. 3 represents a modification of the device intended for attachment to a window-sill, and the remaining figures present different modifications of the invention which may be found necessary in order to adapt it to different positions.

Similar letters of reference in the different figures indicate corresponding parts.

This invention relates especially to devices for facilitating that class of floriculture termed window-gardening, its object being to combine the advantages of convenient holding, and the easy watering and showering, of plants and flowers, in such manner as to preserve perfect neatness to the surroundings, the arrangement of the different devices also enabling them to be readily turned to the light, thus preventing ill shape in their growth, and, further, allowing the tables upon which they stand to be readily raised or lowered at will, to suit the height of the window-sill before which it is placed; and the invention consists in the construction and combination of the different parts, as will be first fully described, and then pointed out in the claims.

A represents a tripod stand resting upon casters B of a peculiar construction, each being double; or, in other words, being formed of a bearer carrying a roller at each end, and the pintle upon which it turns projecting upward from a point midway between them, which arrangement enables the stand to carry its load with great steadiness, and at the same time allows it to turn freely in any direction. A tube, C, rises vertically from the stand, to which it is firmly secured, and is provided with a screw-thread at its upper end, into which screws the collar D, to which is securely fastened the saucer-shaped table E. This forms the stand in its most simple shape; but, in order to produce a more beautiful effect, the supplemental tables F are provided, one or more, thus forming a pyramidal top. These tables may be supported by a central tube, which enters the tube C, and three or more side supports, G, or by either alone; but the combination of the two devices gives it steadiness.

For the purpose of showering the plants a hood, H, is provided, formed of two or more parts, which fit within the raised ledge about the periphery of the table E, and are secured to each other by suitable clamping devices. This hood is also furnished with a sieve, I, which causes the water, when poured upon it, to pass through in the shape of drops or fine streams, producing the same effect as a natural shower, washing off dust, and giving the plants all the refreshing effects of an exposure to a rain-fall.

The waste water, and that dripping from the plants, runs to the middle of the tables, and thence through the vertical central tube to a receptacle placed beneath its open lower end, thus enabling them to be thoroughly showered without danger of wetting carpets, curtains, or any of the many delicate articles of dress or furniture which may be in their immediate vicinity.

Having thus described my invention, I claim as new, and desire to secure by Letters Patent of the United States, the following:

1. The stand A, carrying the tubular standard C, in combination with the concave table E, provided with the screw-threaded stem D, as and for the purpose specified.

2. The stand A, standard C, and table E, in combination with the supplementary tables F, as specified.

3. The hood H, provided with the sieve I, in combination with the table E of the flower-stand, as and for the purpose set forth.

In testimony that I claim the foregoing I have hereunto set my hand.

MARIETTE HEBER McGUIRE.

In the presence of—
ELIZABETH M. A. G. HOOE.
MARGARET E. HERNDON.